(No Model.)

T. J. GOLDSCHMID.
PIPE COUPLING.

No. 255,163.  Patented Mar. 21, 1882.

Witnesses:
Chas. A. Morgenroth.
Otto Luthy

Inventor
Theo. J. Goldschmid

UNITED STATES PATENT OFFICE.

THEODORE J. GOLDSCHMID, OF PHILADELPHIA, PENNSYLVANIA.

PIPE-COUPLING.

SPECIFICATION forming part of Letters Patent No. 255,163, dated March 21, 1882.

Application filed December 6, 1880. (No model.)

*To all whom it may concern:*

Be it known that I, THEO. J. GOLDSCHMID, a citizen of the United States, residing at the city of Philadelphia, State of Pennsylvania, have invented certain new and useful Improvements in Pipe-Couplings; and I do hereby declare the following to be a full, clear, and exact description of the invention, which will enable others skilled in the art to which it appertains to make and use the same, reference being had to the accompanying drawings, and to letters or figures of reference marked thereon, which form a part of this specification.

The object of this invention is to construct a reliable and variously-adaptable pipe-joint, whereby gases and liquids under pressure may be safely confined without the use of cement or solder. Its nature consists in so securing to each pipe end (previously made cross-sectionally circular) forming part of the coupling a flange or plate provided with a shoulder or collar, that said collar shall be concentric with the end of the pipe protruding therefrom, and that the pipe shall project enough to receive a loose socket, which fits the pipe and is concentric therewith as well as with the collar of the flange, the end of said socket being provided with a recess, which, together with the pipe, forms a stuffing-box or groove partially filled with packing material, and of such size as to fit over the shoulder of the flange. The socket, besides the features above mentioned, may have any suitable form for the purposes intended and the shape and location of the pipes with which it is to be connected.

By means of the above-mentioned pipe-coupling pipe-sections of the same or of different diameters, arranged in a straight line or at any angle, can be securely connected with the greatest facility, as also pipes with tanks, reservoirs, or other vessels.

For a fuller understanding of the invention and its adaptability to the several purposes specified, reference will be had to the annexed drawings, which represent various applications of the improved pipe-coupling without changing the nature of the invention.

The same letters of reference are used in all the figures in the designation of identical parts.

Figure 1:
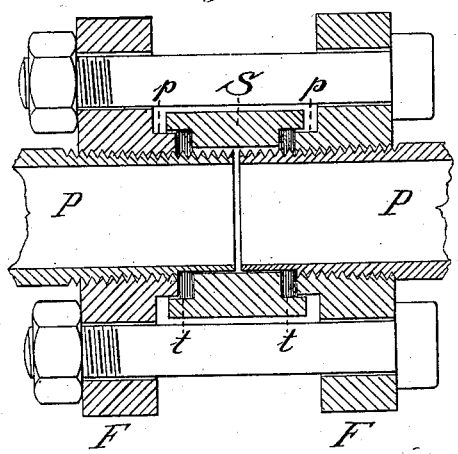

Figure 1 represents a longitudinal section of the improved pipe-coupling as applied to pipes of the same diameter and running in a straight line.

P P represent the two pipes to which the flanges or plates F F are secured by means of threads or other contrivances in such a manner that the shoulders *p p* leave enough of their respective pipes projecting to receive the socket S, the central part of which overlaps and closely fits both pipe ends, while the recessed faces of said socket form, together with the pipes, suitable receptacles or stuffing-boxes to receive the packing material *t t*. The shoulders *p p* are of such shape and size as to fit into said stuffing-box receptacles, entering them sufficiently to prevent the packing material on being squeezed together from escaping in an outward direction, the passage of the packing to the interior of the pipes being stopped by the central part of socket S.

The pipe ends projecting over the shoulders *p p* may be screw-threaded, as shown in the upper half of Fig. 1, or they may be without threads, as indicated in the lower half of Fig. 1; but in either case the clearance between socket S and the pipe ends should be small enough to practically exclude the packing from the interior of the pipes.

The coupling is made tight by creating a pressure between socket S and the flanges F F of sufficient strength to force the packing material round the pipe ends, filling up all the open spaces, and thus producing a perfect joint without the use of cement or solder.

Figure 2:
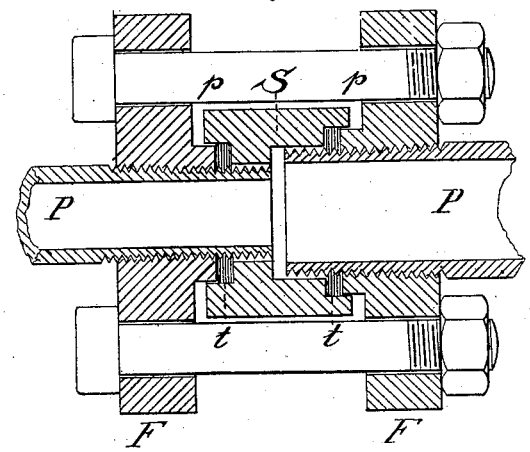

In order to accomplish the above aim, various methods may be applied, one of them being illustrated in Figs. 1 and 2, where the two flanges F F are drawn together by a number of bolts and nuts; but this part of the pipe-coupling having no reference to my invention, any further explanation on this subject is not deemed necessary.

The ordinary welded pipes used in the arts are seldom, if ever, strictly cylindrical, and the screw-threads at the ends are almost invariably cut more or less eccentric to the body of the pipe by reason of the form of the pipe itself or the inaccuracies of the tools or workmanship. Yet in order to make an efficient pipe-joint of the general character hereinbefore described, capable of sustaining high pressure, it is important that the collars and socket between which the packings are compressed should be concentric, in order that they may snugly fit all around. The foregoing description and the drawings show one mode of attaining this object without resorting to expensive dressing of the pipe ends, which is, moreover, possible only to a very limited degree by reason of the thinness of the metal of such pipes. The pipe ends are screw-threaded in the ordinary way, making these screw-threaded ends circular in cross-section, whatever the cross-sectional contour of the body of the pipe may be. The flanges being screwed on these ends, the collars of the flanges will be concentric with these pipe ends, care being had, of course, to make the exterior and interior circles of the collars concentric with each other. Then the socket fitting on the circular ends of the pipe is necessarily concentric with the collars of the flanges also, the packing-recesses being of course made concentric with its bore fitting the pipe ends.

Figure 3:
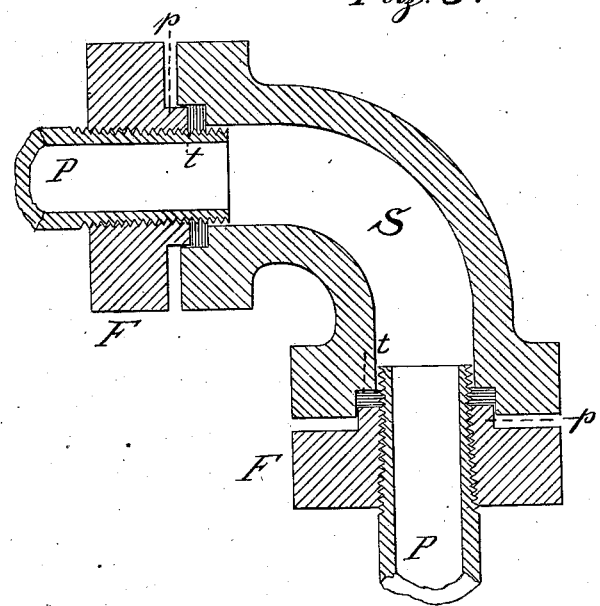

Fig. 2 represents the improved pipe-coupling applied to two pipe-sections of unequal diameters, and Fig. 3 shows how two pipes running at a right angle are connected by the same device. P P are the pipes; F F, the flanges, provided with shoulders $p$ $p$; S, the socket fitting and overlapping both pipe ends and forming with each of them a sort of a stuffing-box for the reception of the packing-rings $t$ $t$ and the shoulders $p$ $p$. In Fig. 3 that part of the socket S lying between the two recesses takes the shape of an elbow, while for other applications its form might be that of a return-bend or that of a T. The method of putting a pressure on the packing-rings will depend on special circumstances, and for reasons before stated it is not shown in Fig. 3.

Figure 4:
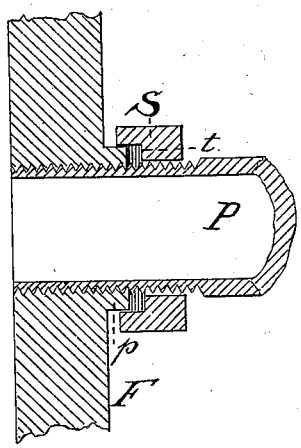

Another application of the improved coupling is illustrated in Fig. 4, representing the connection of a pipe to a reservoir, tank, or other vessel. The shell of the latter takes the place of flange F, and is therefore provided with a shoulder, $p$, and firmly connected with the pipe. Socket S, or more particularly its recessed end, again forms, in conjunction with the pipe, a groove or receptacle, partially filled with packing material $t$, and so fitted as to receive the shoulder $p$. The joint is formed in the usual manner by pressing socket S and flange F against each other by some device not shown in the drawings, because its nature forms no part of this invention. The pipe-joint thus described differs materially from others, in general appearance somewhat similar pipe-joints, in providing for the concentricity of the pipe ends, socket, and collars of the flanges.

What I claim as my invention, and desire to secure by Letters Patent, is—

The combination, substantially as before set forth, of the cross-sectionally circular pipe ends, the flanges or plates secured thereto and having projecting collars concentric therewith, the loose socket snugly fitting and concentric with the pipe ends as well as the collars of the flanges, and the packings.

THEO. J. GOLDSCHMID.

Witnesses:
CHAS. A. MORGENROTH,
OTTO LUTTZ.